United States Patent [19]

Maes, Jr.

[11] 4,249,340
[45] Feb. 10, 1981

[54] SOLAR ENERGY COLLECTOR

[75] Inventor: Reed A. Maes, Jr., Ypsilanti, Mich.

[73] Assignee: Environmental Research Institute of Michigan, Ann Arbor, Mich.

[21] Appl. No.: 967,470

[22] Filed: Dec. 7, 1978

[51] Int. Cl.³ ............................................. A01G 9/00
[52] U.S. Cl. ............................................ 47/17; 47/19; 47/26
[58] Field of Search .................. 126/417, 452; 47/17, 47/19, 26, 29

[56] References Cited

U.S. PATENT DOCUMENTS

| 2,777,253 | 1/1957 | Bensin | 47/26 X |
| 3,249,682 | 5/1966 | Laing | 47/17 X |
| 3,461,605 | 8/1969 | Stanhope | 47/17 |
| 4,095,369 | 6/1978 | Posnansky et al. | 47/17 X |
| 4,128,307 | 12/1978 | Badertscher et al. | 47/17 X |

FOREIGN PATENT DOCUMENTS

| 2391641 | 1/1979 | France | 47/17 |
| 581943 | 11/1976 | Switzerland | 47/17 |
| 1176745 | 1/1970 | United Kingdom | 47/19 |

Primary Examiner—Robert E. Bagwill
Attorney, Agent, or Firm—Krass & Young

[57] ABSTRACT

A solar energy heated structure, such as an occupied building or greenhouse, includes a walled structure enclosing space volume. A movable insulated panel with a reflective surface is pivotably supported within the space volume. In a first position the panel cooperates with an insulated portion of the walled structure to enclose a lower portion of the space volume containing the occupied portion or plant bed and prevents loss of heat therefrom. In a second position the panel is disposed in an upper portion of the space volume, so that solar energy entering the overall space volume through a light transmitting portion of the walled structure is reflected onto the solar energy user by the reflective surface of the panel.

13 Claims, 7 Drawing Figures

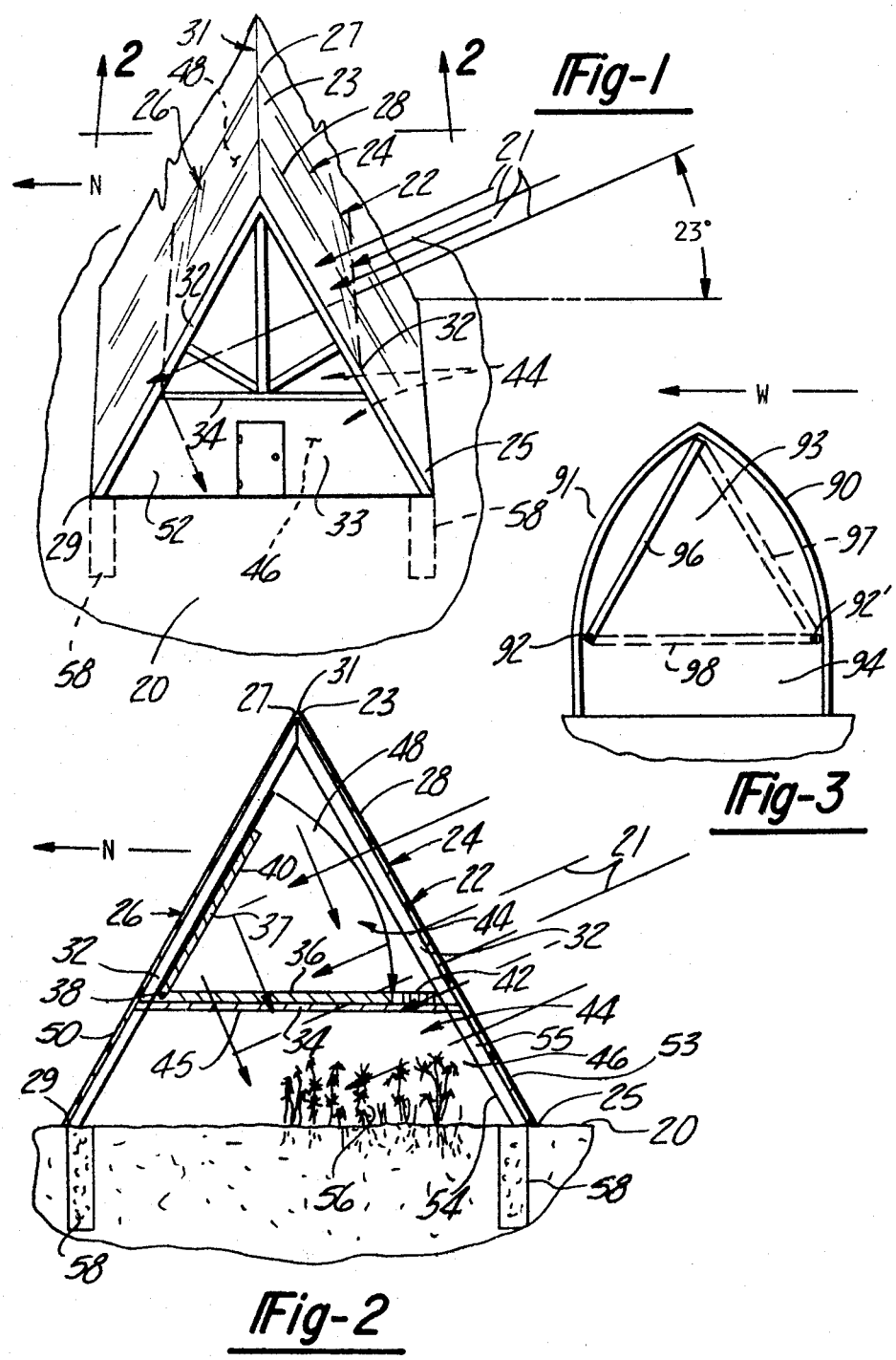

SOLAR ENERGY COLLECTOR

BACKGROUND OF THE INVENTION

1. Field of the Invention

This invention relates to solar energy collectors and in particular to systems for heating enclosed space volumes such as greenhouses and residences.

2. Description of the Prior Art

One of the most widely used prior art devices for heating a space volume is a greenhouse. However, conventional greenhouses have several drawbacks. The transparent walls are poor insulators. Whenever the influx of solar radiation stops, heat losses are dramatic. For this reason, in northern climes, heat must be supplied by auxiliary means.

During winter months, light available for photosynthesis is limited in conventional greenhouse structures. Because the sun is at a low angle to the horizon, the amount of solar radiation falling on a given area of the horizontal plant bed is small. As a result, plants in a conventional greenhouse require excessive time to reach maturity.

Many recent examples of solar collectors used for heating enclosed space volumes incorporate an intermediate member to absorb the heat. The heat is then transferred to the space volume to be heated.

Because of the interjection of the intermediate member, none of the solar radiation reaches the ultimate energy user as visible light. Only heat is transferred.

A significant development in the area of solar energy collectors is the incorporation of external reflector/insulator panels. The panels are movable. During times of solar energy influx, a reflective surface of the panel reflects sunlight into the collector. During absence of solar energy influx, the panels are moved to a position in which they enclose the solar energy collector and insulate against heat loss. For example, see Keyes et al U.S. Pat. Nos. 3,987,786 and 3,894,685; Taylor U.S. Pat. No. 4,016,861; Arant U.S. Pat. No. 4,043,316; Atkinson U.S. Pat. No. 4,059,226; Stelzer U.S. Pat. No. 4,026,269 and Falbel U.S. Pat. No. 3,841,302.

All of these cited devices incorporate panels which extend outside of the enclosed space volume. As a result, the panels are vulnerable to the elements. They cannot be used during even slightly inclement weather because rain or snow degrade their reflectivity. Atmospheric pollutants such as dust and suspended oil alight on the reflective surfaces and diminish their reflectivity. Since the panels must enclose the solar energy collector during stormy weather, rain cannot wash away these deposits, and they accumulate and become difficult to remove.

Los Alamos Solar Laboratory has constructed an experimental Passive Solar Heated Mobil/Modular Home II. This solar heated home incorporates a movable panel which alternately reflects solar energy into the home or insulates against heat loss. However, the solar energy is absorbed in water bags from which heat is withdrawn into the living area. No visible light enters the living space through the collector. The intermediate member also adds to the complexity and cost of construction.

SUMMARY OF THE INVENTION

The principal object of this invention is to provide a system for heating a space volume which will maximize the utilization of available solar radiation influx and minimize the heat loss during the absence of solar influx. Another object of the invention is to provide a solar energy collector which enhances the utilization of the visible rays of the solar radiation to aid photosynthesis. A further object of the invention is to provide these advantages in a device which is secure from the adverse effects of the elements. A still further object of this invention is to accomplish the above stated objects without the utilization of a cumbersome and expensive intermediate member which converts all of the solar radiation into heat.

In general, these objects are accomplished by the use of a walled structure which encloses an overall space volume. The structure has both insulated and light transmitting portions. A panel, pivotably supported within the overall space volume, is insulated and has at least one reflective surface. The panel, in a first position, cooperates with the insulated portion of the walled structure to enclose a first lower space volume within said overall space volume and prevents heat loss therefrom. The panel assumes at least one other position in which it is disposed in a second upper space volume within the overall space volume. In these alternative positions the reflective surface of the panel reflects the solar radiation which passes through the light transmitting portion of the structure into the lower space volume.

Because there is no intermediate member which absorbs the solar radiation before it ultimately contacts the solar energy user, the visible rays of the solar radiation spectrum are reflected directly onto the solar user such as a plant bed or an occupied portion of a building. If the solar user is a group of plants, this visible radiation aids photosynthesis.

In a preferred embodiment, the solar energy collector is an A-frame structure. The structure is generally prismatic in shape with two longitudinal walls that meet at a longitudinal peak. The lower edges of the longitudinal walls are spaced at a a distance from each other. The longitudinal walls in combination with two end walls enclose an overall space volume. A reflective, insulating panel is supported within the overall space volume on a plurality of cross-members which extend laterally between the two longitudinal walls. In a first position the panel rests on the cross-members and in cooperation with the insulated lower portion of the longitudinal walls and end walls, encloses a first lower space volume. In one of a series of second positions disposed above the cross-members in a second upper space volume, the reflective surface of the panel reflects the solar radiation into the first lower space volume.

BRIEF DESCRIPTION OF THE FIGURES

FIG. 1 is a partial perspective view of an A-frame greenhouse.

FIG. 2 is a cross-sectional view of the A-frame greenhouse taken along the lines 2—2 of FIG. 1.

FIG. 3 is a cross-sectional view of another alternative deployment of a reflector/insulator panel in a full cathedral arch greenhouse with a north-south oriented longitudinal axis.

DETAILED DESCRIPTION OF THE ILLUSTRATIVE EMBODIMENTS

Figure 4:
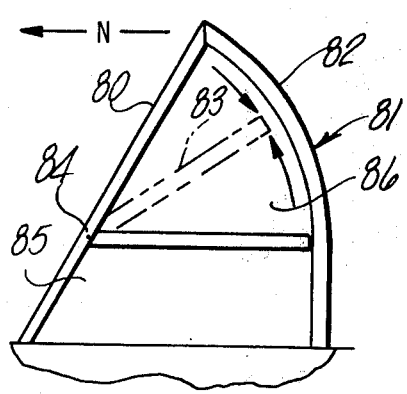
FIG. 4 is a cross-sectional view of a variation of an A-frame greenhouse with a partial cathedral arch.

FIGS. 1 and 2 show a preferred embodiment of this invention. It is a walled structure 22 used as a greenhouse. The structure comprises two longitudinal walls 24 and 26. In this example, wall 24 is a south facing longitudinal wall and wall 26 is a north facing longitudinal wall. The two longitudinal walls are joined at their upper edges 23 and 27 at the longitudinal peak 31. The lower edges 25 and 29 respectively of the longitudinal walls 24 and 26 are spaced apart so as to result in sloping walls.

At the ends of the two longitudinal walls are two lateral end walls, one of which is shown at 33. The longitudinal walls 24 and 26, the lateral end walls 33 and the ground 20 cooperate to enclose an overall space volume 44.

In the preferred embodiment, the longitudinal walls further comprise side frame members 32 which are lengths of 2×4 lumber. Stretched over and fastened to the 2×4's is the light transmitting cover 28 which in this example is a thin polyethylene sheet. The light transmitting cover 28 permits the solar radiation generally shown by the arrows 21 to enter the overall space volume 44. The lateral end walls 33 and the north facing longitudinal wall may be covered with any suitable standard construction material. Examples would be siding, plywood, or thin polyethylene sheets. The steep angle of the sides of the A-frame provide the further advantage of shedding snow in the winter. Accordingly, there is no heat lost to melting snow, and no reduction in heat influx by shading of snow deposits.

Attached to and extending laterally between the side frame members 32 are the cross-members 34. These cross-members 34 stabilize the structure against the wind and snow loads. The structure shown in FIGS. 1 and 2 has a standard A-frame or triangular configuration. The longitudinal walls could assume a number of other shapes such as that shown in FIG. 3 which is discussed below.

In this particular example, the point of attachment of the cross-members 34 to the side frame members 32 defines the division of the walls of the structure between an upper portion and a lower portion. The lower portion of the north facing longitudinal wall 50 and the lower portion of the end walls 52 are insulated using standard insulating materials such as fiberglass. This insulation continues up to the top of the cross-members 34. The lower portion 53 of the south facing longitudinal wall 24 has an inner layer of light transmitting material 54 which can be thin polyethylene sheet of the same type as the outer cover 28. The air space 55 between the outer cover 28 and the inner layer 54 acts as insulation. In order to prevent heat loss through the ground at the base of the walled structure 22, a quantity of expanded resinous material is buried in a trench at the base of the walls to form the ground insulators 58.

An insulated panel, shown in two positions at 36 and 37 of FIG. 2 is pivotably supported in the overall space volume 44. The panel is pivoted on the pivot 38 between the two positions shown in 36 and 37. In the first position 36, the insulated panel cooperates with the insulated lower portions of the end walls 52, the insulated lower portion of the north longitudinal wall 50, and the double layer of light transmitting material on the lower portion of the south facing longitudinal wall 53 to enclose a first lower space volume and prevent loss of heat therefrom. When the panel is pivoted on the pivot 38 to a second position 37, the solar radiation 21 enters through the light transmitting cover 28 of the south facing longitudinal wall 24 and strikes the reflective surface 40 on the panel 37 and is reflected into the first lower space volume 46. When the panel rests in the first position 36 on top of the cross-members 34, it divides the overall space volume into the first lower space volume 46 and the second upper space volume 48. The panel moves in this second upper space volume 48 into a second position 37.

In this specific example, the upper space volume 48 and the lower space volume 46 are open to each other and are closed off only when the panel resets in the first position 36. However, it is considered within the scope of this invention to place a light transmitting optical cover 45 either above or below the cross-members 34 so as to cut off communication between the upper and lower space volumes.

In this specific example, solar radiation 21 is reflected by the reflective surface 40 of the panel 37 onto a plant bed 56. Because there is no intermediate member into which the solar radiation is absorbed and from which it is re-transmitted to the solar user, radiation in the visible spectrum strikes the plant bed 56 and aids photosynthesis. During daylight hours, the reflective panel 37 can substantially increase the light striking the plant bed 56 when the sun is at its lower elevations in the winter. With the light gain provided by the panel 37, the light striking the plant bed 56 aids photosynthesis and reduces the time required for maturation. The reflective panel 37 also increases the heat striking the plant bed 56. This heat is stored in the ground and then released at night to maintain growing temperatures.

While a greenhouse with its longitudinal axis in the east-west direction is preferred, alternate configurations are possible. In order to lengthen the amount of daylight the greenhouse receives, the greenhouse may be placed with its longitudinal axis in the north-south direction. The basic design of the greenhouse is the same as that shown in FIG. 1 and 2 except for the deployment of the insulating panel.

FIG. 3 shows a north-south longitudinally oriented greenhouse with two alternative design features. In the first position 98 the panel divides the overall space volume into a first lower space volume 94 and a second upper space volume 93. Starting at sunrise, until the sun is nearly overhead, the panel assumes position 96 adjacent to the west facing longitudinal wall 91 and reflects the morning rays of the sun into the lower space volume. After the sun reaches its meridian until sunset, the panel rests in the position 97 adjacent the east facing longitudinal wall 90 and reflects the rays of the afternoon sun into the lower space volume 94. During the night the panel assumes the position 98 and in cooperation with the insulated portion of the walls, prevents the loss of heat from the lower space volume.

One of the two alternative features shown in FIG. 3 is the laterally movable pivot shown at 92 and 92' for the panel. During the morning hours the panel pivots at 92 which is adjacent the west facing longitudinal wall 91. During the afternoon the panel pivots on the pivot 92' adjacent the east facing longitudinal wall 90. This result may be achieved in one of the two ways. One may either laterally move the pivot across the top of the cross-frame members (not shown); or when the sun reaches its meridian, drop the panel to the position 98 and then lift the edge of the panel adjacent the west facing longitudinal wall 91 to the peak of the greenhouse.

The second feature shown in FIG. 3 is the use of a full cathedral arch. In order to accommodate the length of the panel as it swings between the first position and the second position, all points on the longitudinal wall are substantially equidistant from the axis adjacent the opposite longitudinal wall. All points on the east facing longitudinal wall 90 between the peak and the top of the cross-frame members are equidistant from the axis 92. All points on the west facing longitudinal wall 91 between the peak and the top of the cross-frame members are substantially equidistant from the pivot 92′ adjacent the east facing longitudinal wall 90. Much detail is omitted from FIG. 3 which is meant only to show the full cathedral arch and the deployment of the insulated panel.

The cathedral arch can also be used to advantage in an east-west longitudinally oriented greenhouse. FIG. 4 shows a greenhouse in which only the south facing longitudinal wall 81 utilizes the cathedral arch concept. Substantially all points on the upper arcuate portion 82 of the south facing longitudinal wall 81 are equidistant from the pivot 84 of the panel 83. The pivot 84 is located adjacent the north facing longitudinal wall 80. The form of the upper portion 82 of the south facing longitudinal wall 81 is an arc that permits the swinging of the panel from a second alternative position in the upper space volume 86 to totally enclose the lower space volume 85 when in the first position.

If the longitudinal walls of the walled structure take the straight line shape as shown in FIGS. 1 and 2, the configuration of the panel 36 must take into account these straight walls. If the panel in the first position 36 extends the full width of the A-frame structure, it will be too long to raise without being blocked by the side frame members 32 of the south facing longitudinal wall 24. Therefore, in order to be raised, the panel must be shortened. The extra length of the panel 42 remains permanently at rest on the cross-members 34. The example shown in FIG. 2 is but one of the many possibilities for the panel configuration. The cathedral arch permits the use of the full width panel without the panel bumping the wall as it moves. The extra length of the panel 42 could also be hinged to the panel 36 and swung back behind the panel as it was moved to keep it away from the longitudinal wall. These and other configurations of the movable panel are considered within the scope of this invention.

Figure 5:
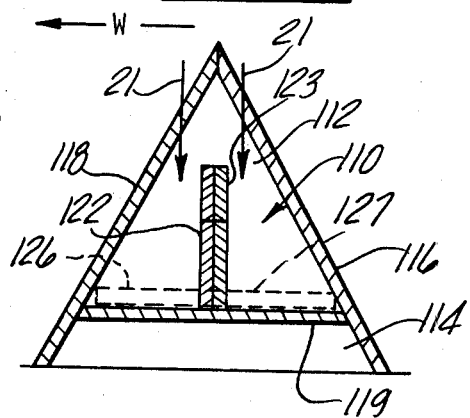
FIGS. 5, 6, and 7 show details of an alternate reflector-insulator panel configuration for an A-frame greenhouse with a north-south oriented longitudinal axis.
Figure 6:
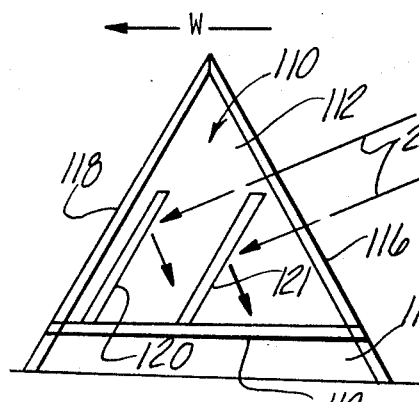
Figure 7:
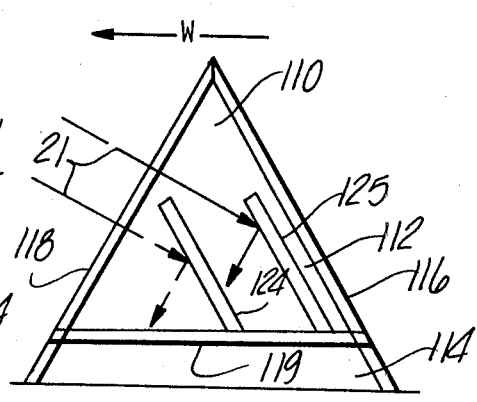

FIGS. 5, 6, and 7 collectively show another alternative deployment of the insulating panel. In this example the insulating panel is constructed in two independently movable sections. Both sections of the two part panel are contained within the overall space volume 110 and move within the second upper space volume 112. As shown in FIG. 6, during the morning hours, solar radiation 21 passes through the east facing longitudinal wall 116 and is reflected off the panel sections as shown at 120 and 121 into the first lower space volume 114. At noon, when the sun's rays 21 come from most nearly overhead, the panel sections as shown at 122 and 123 of FIG. 5, stand in the vertical position to minimize the shadow that they cast. During the afternoon hours, solar radiation 21 passes through the west facing longitudinal wall 118 and strikes the reflective surfaces of the panels as shown at 124 and 125 in FIG. 7 and is reflected down into the lower space volume 114. As shown in FIG. 5, during periods when there is an absence of solar energy influx, such as at night or during storms, panel sections as shown at 126 and 127 rest on the cross-members 119 and in conjunction with the insulated portion of the walled structure totally enclose the lower space volume 114 and prevent the loss of heat therefrom.

Other possible configurations are encompassed within the scope of this invention such as the use of double panels in an east-west longitudinally oriented greenhouse; the use of sections of differing sizes; and the use of a curved rather than flat insulating panels.

While we have shown and described several embodiments in accordance with the present invention, it is obvious that the same is not limited to but is susceptible to numerous changes and modifications as known to those skilled in the art, and I, therefore, do not wish to be limited to the details shown and described herein, but intend to cover all such changes and modifications as are encompassed by the scope of the appended claims.

The embodiments of the invention in which an exclusive property or privilege is claimed are defined as follows:

1. A solar energy collection device comprising:
   a walled structure having a plurality of walls with upper and lower portions defining a first lower space volume and a second upper space volume, at least the lower portions of the walls being insulated, one of said walls being light transmitting for substantially its entire height and having its lower portion insulated with light transmitting material;
   an insulated panel in the upper space volume and having a reflective major surface;
   means for generally horizontally supporting the panel in a first position to enclose the lower space volume in cooperation with the insulated lower portions of the walls to prevent heat loss therefrom; and
   means for pivoting said panel into an inclined second position with said reflective surface of the panel facing the lower space volume for diverting substantial amounts of the solar radiation passing through the upper portion of said light transmitting wall directly into the lower space volume to thereby increase the amount of solar radiation therein.

2. The solar energy collection device of claim 1 including a plant bed disposed within said first lower space volume, whereby the solar radiation reflected onto the plants includes wavelengths which aid photosynthesis.

3. The solar energy collection device of claim 1 wherein the second upper space volume is in direct communication with the first lower space volume when the panel is in one of the second positions and the panel seals off communication between the second upper space volume and the first lower space volume when in the first position.

4. The solar energy collection device of claim 1 wherein the walled structure is an A-frame comprising:
   two longitudinal walls with upper and lower edges, with the upper edges of the longitudinal walls joined at a peak, and with the lower edges of the longitudinal walls spaced at a distance from each other; two lateral end walls joined to the longitudinal walls, with one end wall at each end of the longitudinal walls; and
   a plurality of cross-members extending laterally between the two longitudinal walls, the cross-members being attached to the longitudinal walls mediate said upper and lower edges, the cross members defining a border between the first lower space volume and the second upper space volume, and with the panel resting on the cross-members when in the first position.

5. The solar energy collection device of claim 4 wherein one of the longitudinal walls further comprises:
   a plurality of side frame members supporting a light transmitting cover.

6. The solar energy collection device of claim 4 wherein said longitudinal walls are substantially planar and the A-frame has a substantially triangular lateral cross section.

7. The solar energy collection device of claim 4 wherein the longitudinal walls between the peak and the cross-members form a cylindrical arc with all points substantially equidistant from an axis at the pivotal support of the panel.

8. The solar energy collection device of claim 4 wherein the A-frame has an east-west oriented longitudinal axis and north and south facing longitudinal walls; and the panel pivots on an axis proximate said north facing longitudinal wall.

9. The solar energy collection device of claim 8 wherein:
   the north longitudinal wall has a lower portion below said cross members which is insulated; the south facing longitudinal wall has a lower portion below said cross members which is a double layer of light transmitting material with an air space between, such that the lower portion of the south facing longitudinal wall is both light transmitting and insulated; and wherein a lower portion of each of the end walls of the A-frame below said cross-members is insulated.

10. The solar energy collection device of claim 4 wherein the A-frame has a north-south oriented longitudinal axis and east and west facing longitudinal walls; and wherein the panel pivots on an axis movable laterally between a first axis position proximate the west facing longitudinal wall to a second axis position proximate the east facing longitudinal wall.

11. The solar energy collection device of claim 1 wherein the panel further comprises a plurality of sections capable of independent movement.

12. The solar energy collection device of claim 1 wherein the first lower space volume and the second upper space volume are separated by a light transmitting optical cover.

13. A method of collecting solar radiation comprising:
   mounting an insulated panel with a reflective surface within the upper confines of a walled structure having one substantially completely light transmitting wall;
   insulating lower portions of the walls while maintaining the light transmitting nature of said one wall;
   moving said panel to a position in which substantial amounts of the solar radiation passing through upper portions of said one wall is diverted by the reflective panel surface into the lower confines of the structure; and
   pivoting said panel to a generally horizontal position in which the panel cooperates with the insulated wall portions to enclose the lower confines of the structure to prevent heat loss therefrom.

* * * * *